United States Patent [19]

Brown et al.

[11] Patent Number: 6,047,123
[45] Date of Patent: *Apr. 4, 2000

[54] METHODS FOR RECORDING A COMPILABLE GRAPHICS CALL TRACE

[75] Inventors: John M Brown; Don W Dyer; Gautam Mehrotra; Carol L Lang, all of Fort Collins, Colo.

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/775,271

[22] Filed: Mar. 27, 1997

[51] Int. Cl.7 ........................................................ G06F 9/44
[52] U.S. Cl. ............................................ 395/704; 395/708
[58] Field of Search ...................... 395/704, 705, 395/708, 680, 683, 684, 183.13, 183.14, 500, 709, 707, 706, 703, 702, 701, 710, 712

[56] References Cited

U.S. PATENT DOCUMENTS

| | | | |
|---|---|---|---|
| 4,931,928 | 6/1990 | Greenfeld | 395/708 |
| 5,313,616 | 5/1994 | Cline et al. | 395/500 |
| 5,828,883 | 10/1998 | Hall | 395/704 |

OTHER PUBLICATIONS

Microsoft Visual C++ Source Profiler, 1993.

Borland Turbo Profiler 2.0, 1991.

International Business Machines Corporation, "ZAPdb OpenGL Interactive Debugger Version 2.3", Software Instructions, Copyright 1994–1997.

*Primary Examiner*—Eric W. Stamber
*Assistant Examiner*—Todd Ingberg

[57] ABSTRACT

The invention provides improved methods for analyzing library calls made by a program and, particularly, improved methods of call tracing. Such methods include executing the program, recording source code instructions corresponding to at least selected calls issued during such execution, and recording at least selected data referred to in those calls. The data is recorded separately from the source code, e.g., in a separate file.

19 Claims, 6 Drawing Sheets

METHODS FOR RECORDING A COMPILABLE GRAPHICS CALL TRACE

BACKGROUND OF THE INVENTION

The invention pertains to digital data processing and, more particularly, to improved methods for tracing and analyzing calls issued by a computer program. The invention has application, for example, in analyzing usage of a graphics library by an applications program.

Computers have long been used to generate graphical images. Though early computer systems were capable of imaging in only two dimensions, they found ready acceptance in automated drafting, cartography, and the like. By the mid-1970's, three-dimensional graphics systems became commercially available. The systems tended to be quite expensive, requiring dedicated hardware and custom software.

Over the years standardized graphical programming interfaces and libraries have become readily available in the marketplace. Applications programs can now be written to generate three-dimensional images by calling subroutines (or functions), provided in industry-standard graphics libraries, such as those complying with the "OpenGL" specification. The relative ease with which three-dimensional graphics can be generated has led to a proliferation of applications, e.g., for business, technical and scientific simulation, user interfaces, and animation.

Though three-dimensional objects are sometimes shown as "wire-frame" images (in which only the edges of the objects are drawn), it is increasingly common to render all visible surfaces. A standard technique for drawing such "solid body" images is to graphically construct their surfaces from simple geometric shapes, such as lines, triangles, squares and other polyhedrons. An image of a desk, for example, may be rendered by drawing tens or hundreds of thousands of small line segments and triangles, placed side-by-side and individually textured to represent corresponding surfaces of the actual desk. Though graphics libraries have greatly simplified this task, the rendering of a solid body image can require thousands or millions of calls to a library.

Call tracing, a conventional technique for analyzing how an applications program utilizes a library, involves tracking all calls made by the program to the library. Computer programmers typically use call tracing to debug programs that are not functioning in the expected manner. The technique is also used in determining which subroutines in a library are used most often. This can aid in tuning or optimizing the applications program or the library itself.

Call tracing is usually accomplished by modifying the applications program source code to display or print a message as each call is made. Alternatively, it is accomplished by executing the program under the control of a debugger that automatically provides such notification at designated breakpoints.

While call tracing can be effective for many computer programs, it has traditionally been of little value in graphics applications. Even when the calls made to the graphics library can be identified, their sheer number makes analysis virtually impossible. This is compounded by the fact that many graphics calls refer to arrays and other data structures that while, individually, may not be large, in sum, amount to a large quantity of data.

An object of this invention is to provide improved methods for digital data processing and, more particularly, improved methods for analyzing calls issued by a computer program.

A still more particular object of the invention is to provide improved methods for analyzing usage of a graphics library by an applications program.

Yet another object of the invention is to provide improved methods of call tracing.

A related object of the invention is to provide improved methods of call tracing that facilitate debugging, tuning or optimizing library usage and, particularly, graphics library usage.

SUMMARY OF THE INVENTION

The aforementioned objects are among those attained by the invention, which provides improved methods for analyzing calls issued by a computer program and, particularly, improved methods recording and analyzing a call trace. According to one aspect of the invention, such a method comprises executing a computer program, recording source code instructions corresponding to at least selected calls issued during such execution, and recording at least selected data referred to in those calls. The data is recorded separately from the source code, e.g., in a separate file.

For example, calls issued during execution of the program can be intercepted, e.g., by "shell" or "stub" procedures having the same names as called procedures. The intercepting procedures can store, in a file, source code instructions of the type that produced the call. Data referred to in the intercepted calls can be written to other files. Once source code corresponding to each call has been recorded, the shell procedure can issue a call duplicating the intercepted one, thereby invoking the procedure originally requested by the program. The invention can also record the execution time of that procedure.

In a related aspect, a method as described above stores source code instructions in one or more source code files. Each file includes source code instructions corresponding to a succession of calls issued during execution of the computer program. Thus, for example, a first file includes source code corresponding to the first thousand calls issued by the program; a second file, the second thousand calls; and so forth.

Another aspect of the invention provides a method as described above in which data that is accessed by reference in the intercepted calls are stored in the data file. Source code instructions for those calls are written to the source code file, with appropriate references to the storage location in the data file. Data accessed by value, on the other hand, can be written to the source code file, along with the corresponding source code instructions.

Yet another aspect of the invention provides methods as described above for analyzing calls issued by a computer program to a graphics library.

In a related aspect, the invention provides methods as described above including the additional step of analyzing execution of the computer program. Such analysis can include compiling and executing the instructions contained in the source code files. It can also include identifying one or more graphics primitives rendered by calls in the instruction sequence, identifying a composite graphical state in which those primitives are rendered, and reporting one or more of those composite graphical states, along with the primitives rendered in that state.

These and other aspects of the invention are evident in the drawings and the detailed description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
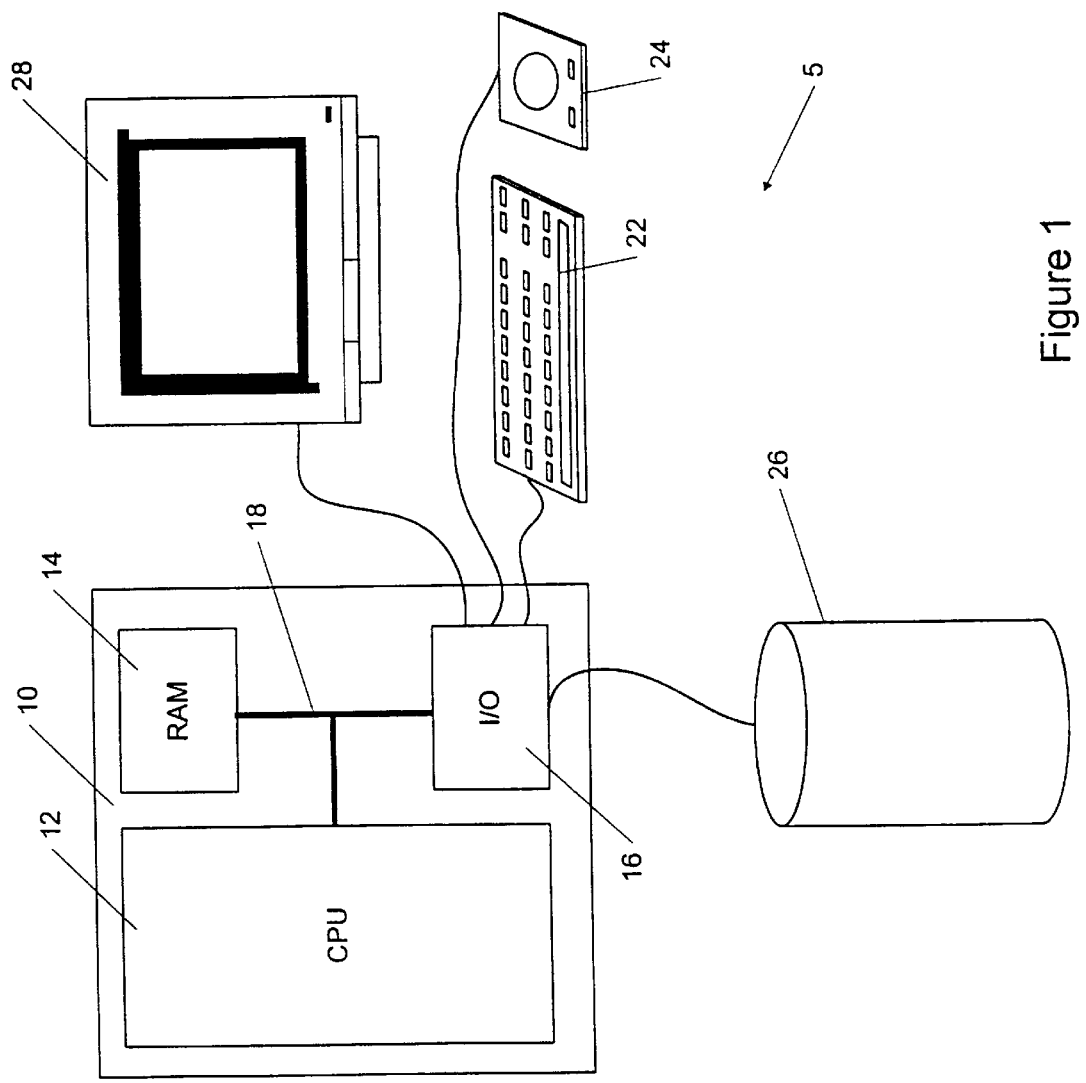
FIG. 1 depicts a digital data processing systems of the type in which the invention is practiced.

FIG. 1 depicts a digital data processing system 5 of the type used to practice the invention. The system 5 includes a digital data processor 10 having a central processing unit 12, random access memory 14 and input/output controller 16 interconnected by backplane or bus 18. Keyboard 22 and pointing device 24, along with other input devices (not shown), are coupled to the computer 10 via input/output controller 16 for entry of data and control information. The computer 10 is also connected to a disk drive 26, as well as other static storage devices (not shown), for access and storage of information. Monitor 28, as well as other output devices (not shown) are likewise coupled to controller 16 for display of information, such as three-dimensional graphics.

Illustrated system 5, including components 10–28, can be any known general-purpose or special-purpose computing system. Preferably, they are three-dimensional graphics-capable workstations, for example, of the type available from the assignee hereof, programmed and/or operated in accord with the teachings hereof for analysis of library calls issued by a program and, particularly, analysis of graphics library calls issued by a graphics applications program.

Figure 2:
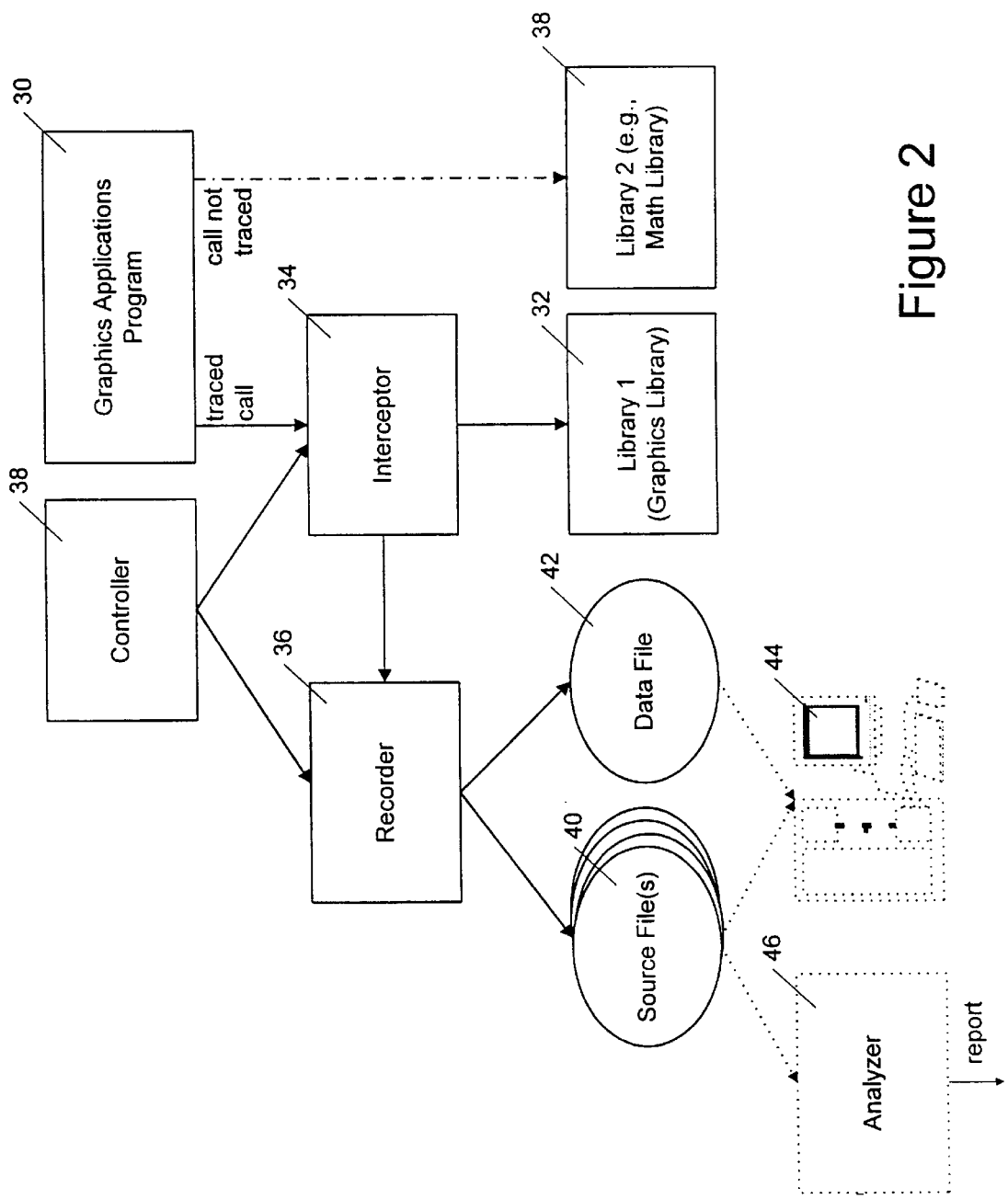
FIG. 2 depicts the software architecture for practicing a method according to the invention for analyzing calls made by a computer program.

As shown in FIG. 2, the illustrated digital data processing system 5 executes an applications program 30 that responds to instructions received from the user, e.g., via input devices 22, 24, to perform a specific graphics task, e.g., generating a three-dimensional image of a desk. To facilitate generation of graphics on output devices 28, the applications program 30 generates calls to procedures contained in a graphics library 32.

Illustrated applications program 30 may represent a special-purpose computer program, e.g., for creating and manipulating an image of a specific object, such as a desk. It may also represent a computer-aided design (CAD) program or other general-purpose graphics program capable of generating an image of an object in response to a command or macro sequence issued by the user.

The graphics library 32 represents any set of procedures and data structures, e.g., procedural or object-oriented in nature, that maintain data structures and issue commands (typically, hardware-independent) for display of graphics. That library can operate in accord with any industry standard, such as the OpenGL applications program interface (API) specification. Likewise, it can operate in accord with any vendor-specific or ad hoc standards.

Illustrated graphics library 32 also includes window management, rendering context, and other environment-specific routines used in connection with the foregoing. In this latter regard, those skilled in the art will appreciate that such routines are not always included in formal graphics libraries, such as those compliant with the OpenGL specification. Nevertheless, the routines are typically provided in adjunct libraries provided for the hardware and/or operating system under which the host system 5 operates. Examples of such adjunct libraries include the WGL library that permits use of OpenGL in Windows™ 32-bit environments (e.g., Windows 95™ and Windows NT™) and the GLX library that permits use of OpenGL in the Unix environment.

Though a preferred embodiment of the invention is intended to analyze usage of graphics library 32, the invention is not so limited. It can be applied equally to analyzing calls issued by any instruction sequence to a library, to stand alone routines, to inline routines, or otherwise. As used herein, "routine" refers to a subroutine, function, procedure or other entry point of an executable instruction sequence.

At least selected function, procedure or other calls (collectively, "procedure calls" or "calls") issued by applications program 30 during execution are captured by interceptor 34 and recorded by recorder 36. These calls are marked in the drawing as "traced" calls. In the illustrated embodiment, these include all calls to the graphics library 32. In other embodiments, these may include calls to other libraries or routines, as well. The traced calls are recorded and analyzed, as discussed below, in addition to being reissued for processing by library 32.

Other calls issued by the applications program 30 are not processed in accord with the invention. These are marked in the drawing as "not traced." In the illustrated embodiment, these include calls to the file system, math libraries, etc. The calls that are not traced are passed directly to the respective library (or libraries) 38 in the conventional manner.

The interceptor 34 and recorder 36 operate under control of controller 38, which provides an interface (via input devices 22, 24 and monitor 28) through which the operator can enable and disable recording. The controller 38 also permits the operator to specify files names for the source code file 40 and data file 42.

Interceptor 34 is a collection of "shell" or "stub" procedures having names and parameter identical to those of the traced calls to be captured. The shell procedures are preferably implemented as dynamically linked libraries (DLL's) that are linked with the applications program 30 prior to library 32.

Figure 3:
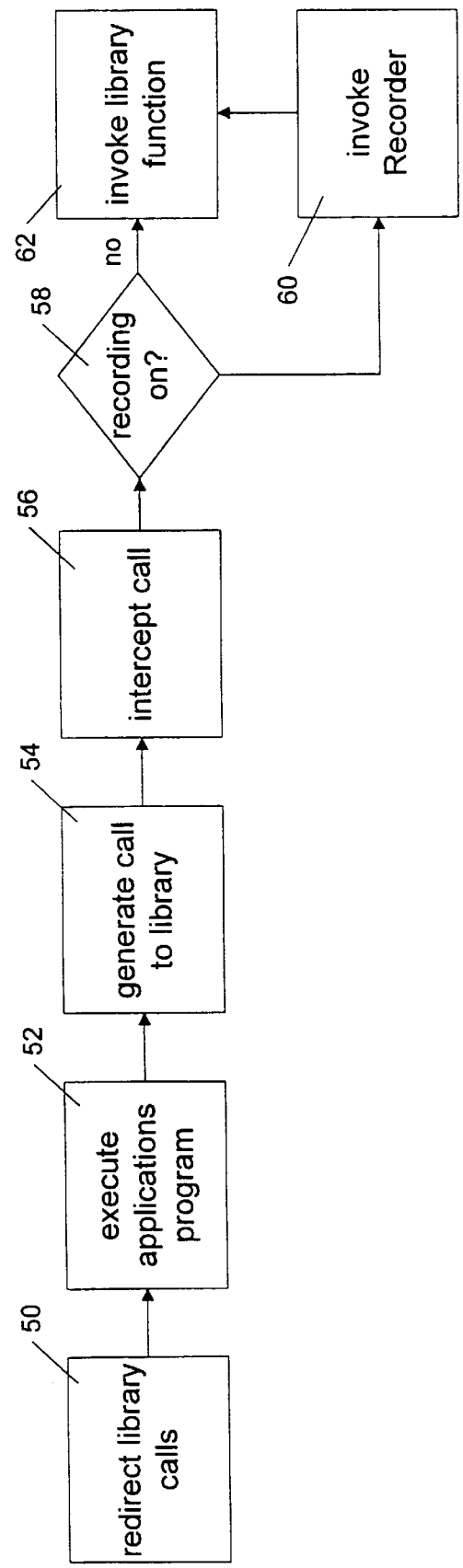
FIG. 3 is a flow chart depicting a method of intercepting traced calls in a system according to the invention.

Referring to step 50 of FIG. 3, to effect this linking the operator can command host processor 12 to redirect calls from graphics library 32 to the file or directory containing the shell procedures. Once execution of the applications program is then initiated (step 52), it generates calls to be traced (step 54), which are intercepted by the shell procedures (step 56).

Those skilled in the art will, of course, appreciate that the shell procedures can be linked to the applications program 30 in any number of others ways commonly known in the art.

Those skilled in the art will appreciate that the interceptor element 34 can be implemented in other ways that permit identification of calls issued by the applications program 30. For example, element 34 can be implemented invasively, e.g., by incorporation into the applications program 30 or library 32 additional statements for notifying the recorder element 36, or other such functionality, of those calls.

Once it has captured a traced call, illustrated interceptor element 34 passes the procedure name and parameter list to recorder 36, if the operator has enabled recording via an instruction issued to controller 38. See steps 58–60. Regardless of whether recording is enabled, the interceptor 34 invokes the graphics library 32 with the intercepted call (step 62), permitting the applications program 30 to run in the normal manner, while the interceptor 34 and recorder 36 are tracking the traced calls.

As recorder 36 receives successive procedure names and parameter lists from the interceptor 34, it records corresponding source code statements in source file 40. As a result, file 40 contains not only a trace of calls issued by the applications program 30 but, more particularly, a compilable call trace providing a "hardcoded" sequence of the issued calls, i.e., an explicit sequence.

In a sense, recorder 36 "decompiles" the traced calls, converting them from executed instructions back into source code. However, unlike a conventional decompiler that converts object code regardless of whether that code will ever be executed, the recorder 36 can generate source code every time one of the traced calls is executed.

By way of example, if the applications program 30 issues calls to the library 32 to draw a triangle with vertices at the coordinates (−1,0,2), (0,1,2), and (0,0,−4), respectively, the recorder writes to the source code file 40 corresponding successive lines of source code, e.g.,

```
glBegin(GL_TRIANGLES);
    glVertex3f(-1.0f, 0.0f, 2.0f);
    glVertex3f(0.0f, 1.0f, 2.0f);
    glVertex3f(0.0f, 0.0f, -4.0f);
glEND( );
```

Source code file 40 can be a text file, word processing file, applications program development file, or any other file or storage area in which source code can be stored. Preferably, file 40 is of the type normally used by system 5 to store the source code corresponding to applications programs.

Figure 4:
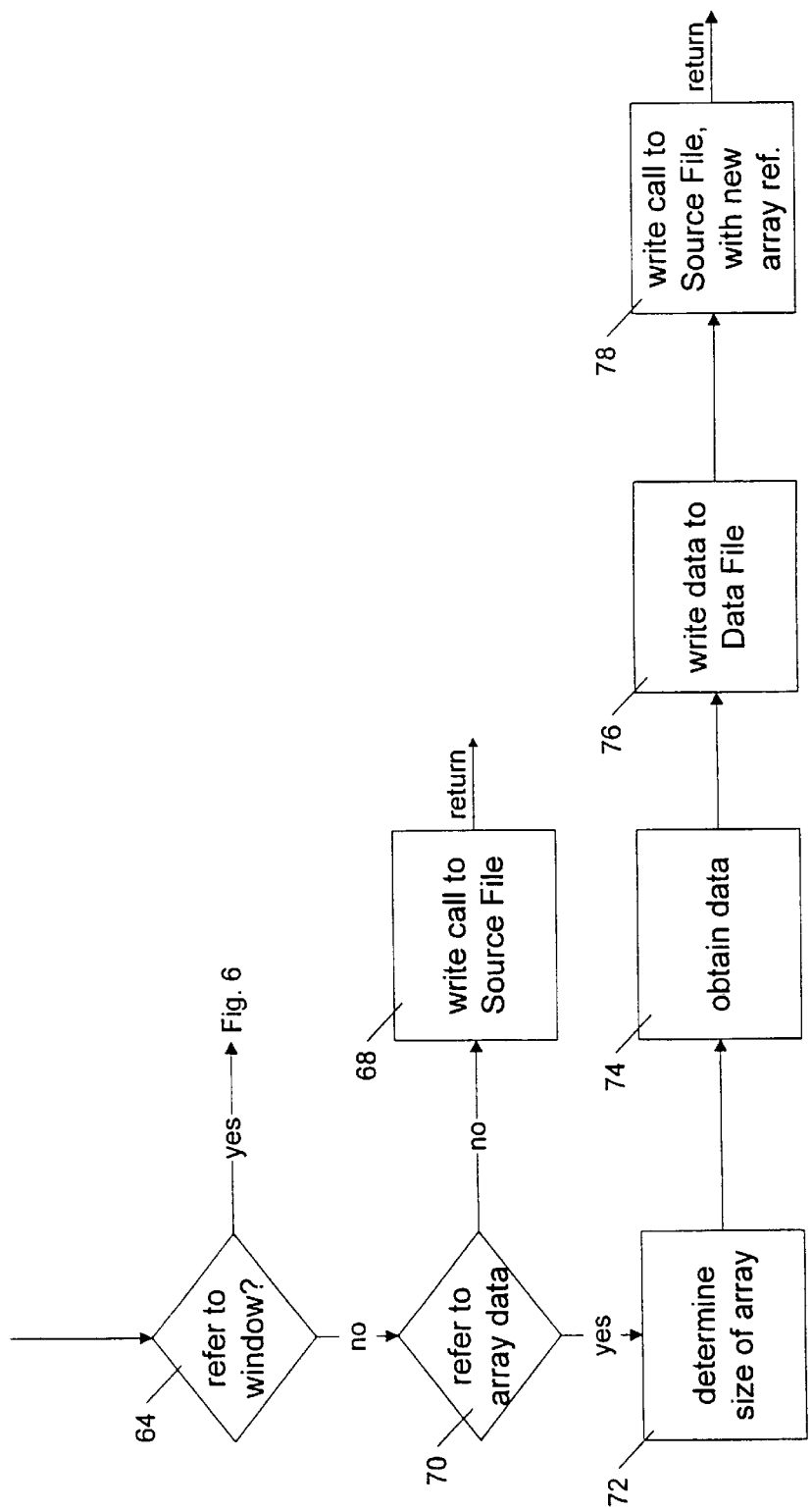
FIG. 4 is a flow chart depicting a method of recording traced calls in a system according to the invention.

Operation of the recorder 38 is shown in FIG. 4. In step 64, the recorder determines whether an intercepted call refers to a graphical window in which drawings are to be rendered. If so, the call is processed in accord with the methodology shown in FIG. 6, which writes to the source code file 40 all calls and source code instructions necessary create and/or maintain the relevant window or to establish the rendering context to which the window applies. In the event that the source code file 40 will ultimately be compiled and executed for use in another machine environment (e.g., to permit testing of graphics generation on that system), recorder 38 can substitute appropriate window and rendering context instructions for that other environment.

Figure 6:
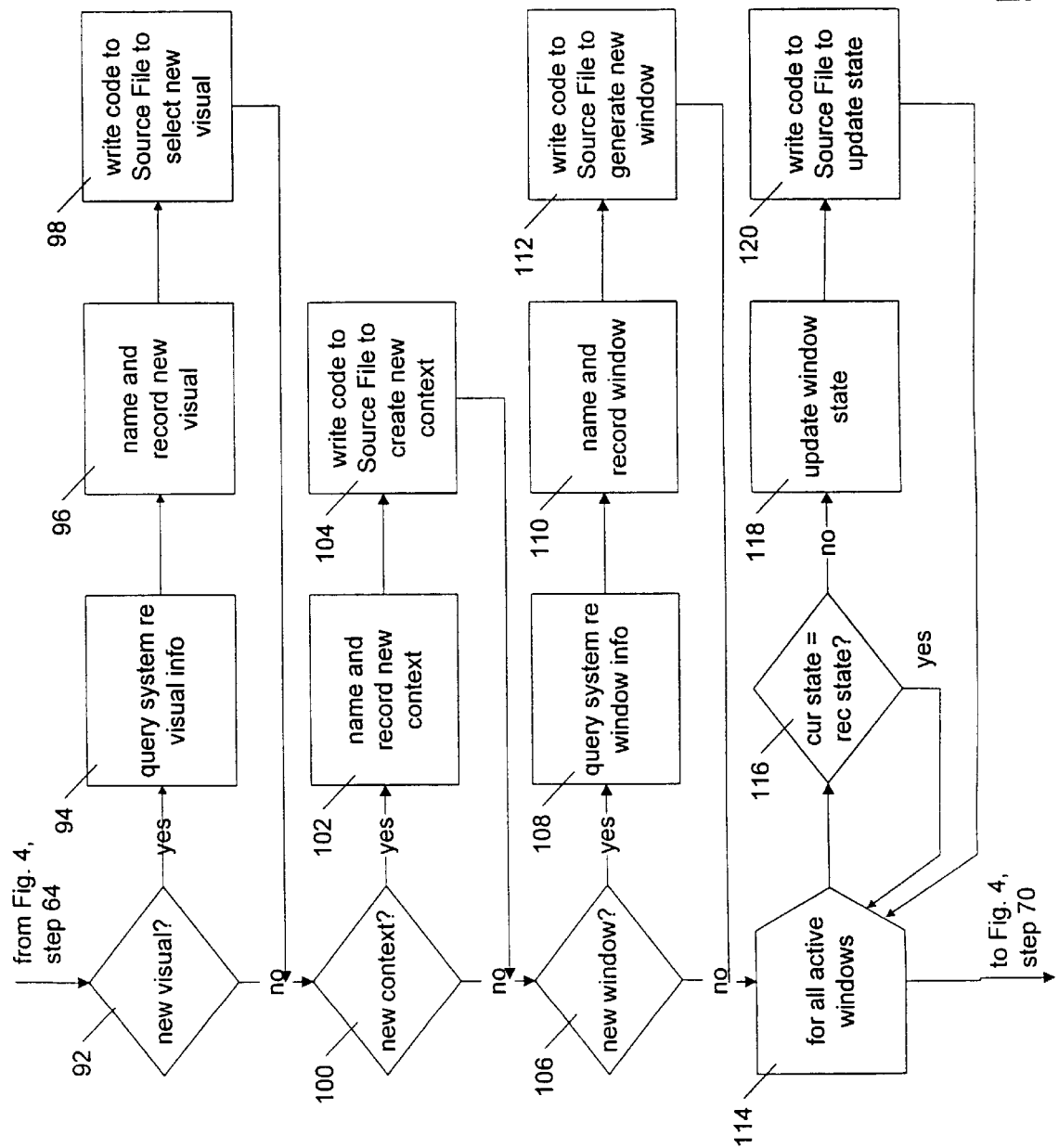
FIG. 6 is a flow chart depicting a method of generating windowing and context-related source code in a system according to the invention.

Referring to FIG. 6, in steps 92–98, the recorder determines whether the intercepted call refers to a new visual and, if so, writes source code to the source code file 40 to select that visual. Steps 94–98, which are applicable to the X11 Window System, can be applied directly or using analogous instructions, depending on the machine environment in which the source code file 40 will ultimately be used.

In step 92, the recorder determines whether the intercepted call refers to a visual not previously identified by the recorder, i.e., a "new" visual. If so, in step 94, the recorder queries the windowing system to obtain the attributes of the visual. In step 96, the recorder assigns a name to the visual and records that name (i.e., for purposes of generating further source code references to the visual). In step 98, the recorder writes source code to file 40 for selecting the visual. An example of that source code, applicable to digital data processing systems utilizing the X11 Window System, follows:

```
{
    int buf[11] = {GLX_RGBA,
        GLX_DOUBLEBUFFER, GLX_RED_SIZE,8,
        GLX_GREEN_SIZE,8, GLX_BLUE_SIZE,8,
        GLX_STENCIL_SIZE,1,0}
    if(!vis0)      vis0 = glXChooseVisual (display,0,buf);
}
```

In step 100, the recorder determines whether the intercepted call refers to a context not previously identified by the recorder, i.e., a "new" context. If so, in step 102, the recorder assigns a name to the context and records that name. Thereafter, in step 104, the recorder writes to file 40 source code for creating the context. An example of that source code, applicable to digital data processing systems utilizing the X11 Window System, follows:

```
if (!cxt0) cxt0=glXCreateContext(display, vis0,NULL,True);
```

In step 106, the recorder determines whether the intercepted call refers to a window not previously identified by the recorder, i.e., a "new" window. If so, in step 108, the recorder queries the windowing system to obtain the attributes of the window. In step 110, the recorder assigns a name to the window and records that name. In step 112, the recorder writes source code to file 40 source code for selecting the window. An example of that source code, applicable to digital data processing systems utilizing the X11 Window System, follows:

```
if(?draw0)
{
    Colormap cmap;
    XSetWindowAttributes swa;
    XEvent event;
    cmap = XCreateColormap (display, RootWindow (display,
            vis0→screen), vis0→visual, AllocNone);
    swa.colormap = cmap;
    swa.borderpixel = 0;
    swa.event_mask = StructureNotifyMask;
    draw0 = XCreateWindow (display; RootWindow (display,
        vis0→screen), 50, 50, 750, 650, 0, vis0→depth, InputOutput,
        vis0→visual,
        CWBorderPixel|CWColormap|CWEventMask, &swa);
}
```

In step 114, the recorder initiates a loop through all active windows. In step 116, the recorder determines whether the actual state of the window (vis-a-vis applications program 30) is the same as the state currently "known" to the recorder. If so, the recorder continues to the next window. Otherwise, in step 118, the recorder updates its record of the state of the window and, in step 120, writes source code to file 40 to update the state of that window in the recorded source code. An example of that source code, applicable to digital data processing systems utilizing the X11 Window System, follows:

```
if (?draw0_mapped)
{
    XEvent event;
    XMapRaised (display, draw0);
```

```
        XIfEvent (display, &event, WaitForNotify; (char *) draw0);
        draw0_mapped = True;
    }
    {
        XWindowChanges values;
        values.stack_mode = TopIf;
        XConfigureWindow (display, draw0, CWStackMode, & values);
    }
```

Following the looping operations of steps 114–120, flow control returns to step 70 of FIG. 4.

As noted above, an applications program can issue thousands or millions of calls to a graphics library during generation of a single three-dimensional image. Writing that many lines to a single function or subroutine in a single source code file might overwhelm the file system, compiler, or other application development tools provided on digital data processing system 5. The recorder, accordingly, provides mechanisms for reducing the size of individual source code functions, as well as files.

One of those mechanisms is to store at least selected data separately from the intercepted calls that refer to those data. Particularly, in step 70, the recorder determines whether an intercepted call accesses data by reference or, more fully, whether the call includes a pass by reference or pass by address parameter. If so, in steps 72–76 the recorder obtains those data (e.g., using the addresses supplied in the intercepted call) and stores them, preferably, in compressed form, in data file 42. In step 78, the recorder writes a source code instruction corresponding to the intercepted call to the source code file 42. Rather than using the same address as supplied in the intercepted call itself, the recorder substitutes the address of the corresponding data in the data file 42.

In a preferred embodiment, data file 42 is a binary file. Those skilled in the art will, of course, appreciate that it can be a text file or any other file or storage area of the type in which data can be stored.

Partitioning is another mechanism provided by the invention to reduce the size of the source routines and source code file 40. Rather than writing all source code to a single function or subroutine in a single file, the recorder 36 can write successive batches of source code to successive subroutines (referred to herein as "subfunctions") in successive source code files 40.

In a preferred embodiment of the invention, each subfunction is approximately 1000 lines long and each source code file contains up to approximately 50 subfunctions (for a total of up to approximately 50,000 lines of source code per source code file). Those skilled in the art will, of course, appreciate that other batch sizes can be used. To coordinate execution of multiple successive subfunctions, the recorder 36 generates a master source code file that calls those subfunctions in succession, as indicated below, using actual and pseudo OpenGL calls.

```
Master Source Code File:    void main(void)
                            {
                                sub_fcn1( );
                                sub_fcn2( );
                                sub_fcn3( );
                                .
                                .
                                .
                                sub_fcn51( );
                                .
                                .
                                .
                                sub_fcn101( );
                                .
                                .
                                .
                            }
Source Code SubFile 1:      void sub_fcn1(void)
                            {
                                glBegin(GL_TRIANGLES);
                                glVertex3f(-1.0f, 0.0f, 2.0f);
                                glVertex3f(0.0f, 1.0f, 2.0f);
                                glVertex3f(0.0f, 0.0f, -4.0f);
                                glEND( );
                                .
                                .
                                .
                            }
Source Code SubFile 2:      void sub_fcn51(void)
                            {
                                glXXXXX(xxx,xxx,xxxx);
                                glXXXXX(xxx,xxx,xxxx);
                                glXXXXX(xxx,xxx,xxxx);
                                glXXXXX(xxx,xxx,xxxx);
                                .
                                .
                                .
                            }
Source Code SubFile 3:      void sub_fcn101(void)
                            {
                                glXXXXX(xxx,xxx,xxxx);
                                glXXXXX(xxx,xxx,xxxx);
                                glXXXXX(xxx,xxx,xxxx);
                                glXXXXX(xxx,xxx,xxxx);
                                .
                                .
                                .
                            }
``` where, glXXXXX(xxx,xxx,xxxx) represents any permissible source statement and, preferably, a call to library 32.

Figure 5:
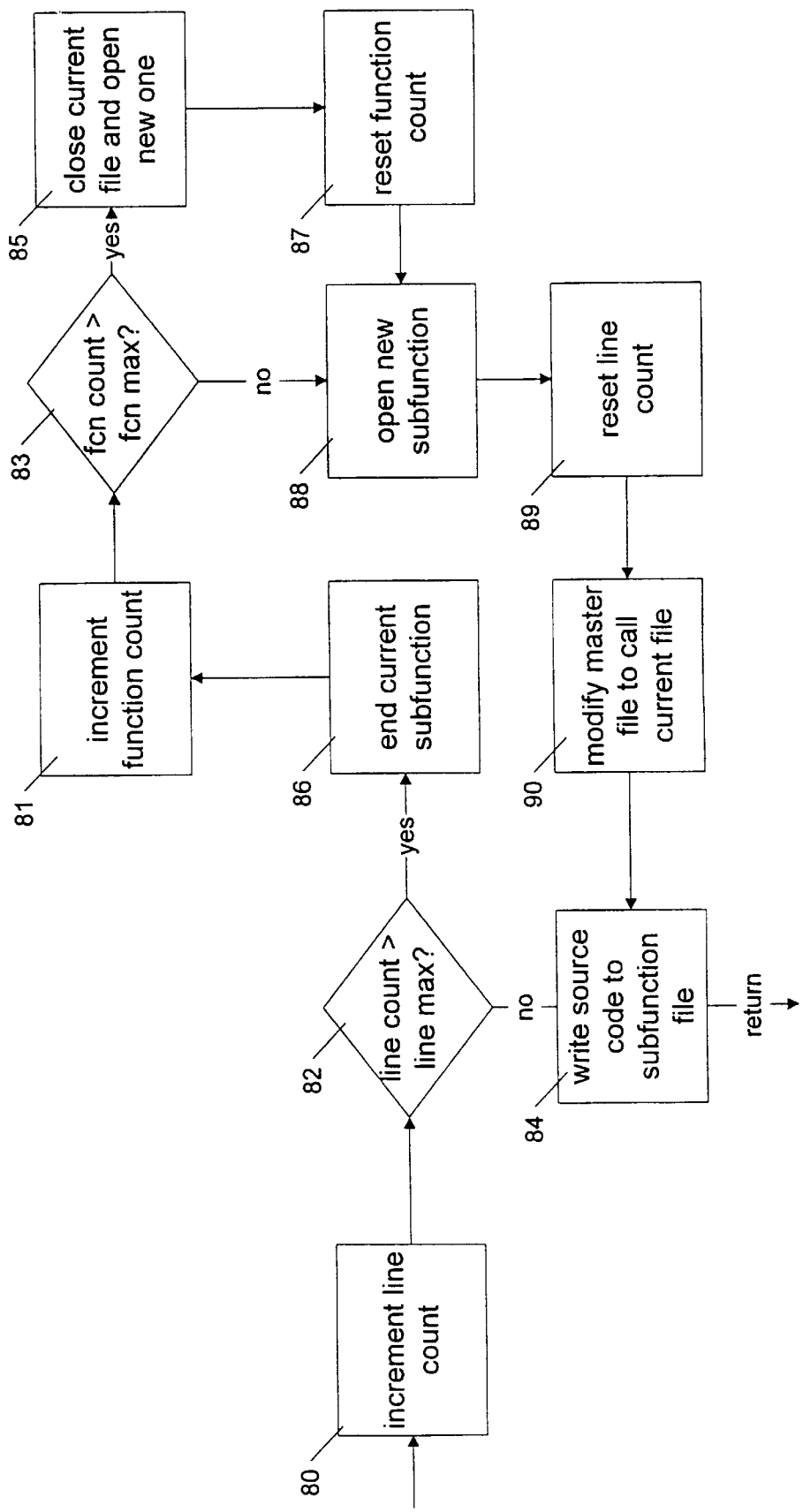
FIG. 5 is a flow chart depicting a method of partitioning source code written to a source code file in a system according to the invention.

A preferred methodology used by the recorder to partition the source code files 40 is shown in FIG. 5. In step 80, the recorder increments the line count to indicate how many lines will be written to the current subfunction. According to step 82, if that count falls below a preset maximum, such as 1000, the source code corresponding for the current intercepted call is written to the current subfunction (step 84). Otherwise, the current subfunction is closed (step 86) and the function count is incremented (step 81). In step 83, the recorder tests whether the function count exceeds a threshold, e.g., 50. If so, the recorder closes the current source code file, opens a new file (step 85) and resets the function count (step 87). If not, the recorder starts a new subfunction in the current file (step 88), with an appropriate subroutine declaration. At the same time, the line count is reset, e.g., to zero (step 89). To insure that source code written to the new subfunction will be invoked, the master source code file is updated to include a call to it (step 90). Finally, in step 84, the source code for the intercepted call is written to the current subfile.

Referring back to steps 64 and 70, if the intercepted instruction does not refer to a window and if it does not access data by reference, the recorder utilizes step 68 to record a source code instruction corresponding to the intercepted call to the source code file 40. Thus, for example, source code corresponding to an intercepted call that accesses data by value is stored in file 40 (with the referenced data).

In accord with the operations discussed above, after execution of the applications program 30 has ceased or recording has been disabled (per controller 38), the information stored in source code file(s) 40 and data file 42 can be utilized to analyze the applications program 30 and library 32. More particularly, that information can facilitate analysis of the applications program's call sequence or its usage of library 32.

At a minimum, the source code statements contained in file(s) 40 provide a trace of calls issued by applications program 30 to library 32. Unlike prior art traces, however, the statements contained those files are compilable. Thus, they can be compiled and executed on digital data processing system 5 or on another such system 44. The advantage of this is that it permits the programmer to test, e.g., on system 5, those aspects of the applications program that specifically relate to the traced library. For example, if the applications program 32 normally runs unexpectedly slowly or crashes, execution of the compilable trace in file(s) 40 will help the programmer isolate the cause. Another advantage is that it permits the programmer to determine whether traced calls are compatible with other systems, e.g., system 44.

The invention also contemplates analysis of the source code in file(s) 40 via use of analyzer 46. The analyzer 46 utilizes the methodologies described in copending, commonly assigned U.S. patent application Ser. No. 08/775,272, filed concurrently herewith, by inventors John M. Brown and Gautam Mehrotra, the teachings of which are incorporated herein by reference.

In accord with that application, the analyzer 46 can intercept graphics calls issued during execution of the source code file(s) 40 and identify primitives rendered by such execution, along with the graphical states (such as illumination, shading, texture, and so forth) in which those primitives are rendered. Alternatively, analyzer 46 can interpret directly the source code contained in file(s) 40 directly (i.e., without actual execution of the code), in accord with the methodology of FIG. 3 of that application.

Analyzer 46 also preferably reports the results of that analysis in the manner described in connection with element 40, of FIG. 2, of that application. To wit, the analyzer generates a report cataloging the primitives by the states in which they are rendered, along with a list of the primitives rendered in that state.

Described above are improved methods, meeting the foregoing objects, for analyzing usage of a software library applicable, for example, in analysis of calls issued during the generation of graphical images. It will be appreciated that the embodiments shown in the drawings and described above are merely supplied by way of example and that other embodiments incorporating modifications thereto fall within the scope of the invention. Thus, for example, it will be appreciated that, although the foregoing examples were based on calls provided in the OpenGL library, the invention can be used with other graphics and non-graphics software libraries, as well as with other individual routines or collections of routines (whether or not they constitute libraries).

In view of the foregoing, what we claim is:

1. A method for analyzing calls issued by a computer program, the method comprising the steps of:
    (A) executing the computer program;
    (B) recording source code instructions corresponding to at least selected calls issued during such execution; and
    (C) recording, separately from the source code instructions, at least selected data referred to by those calls.

2. The method according to claim 1, wherein step (B) comprises recording the source code instructions in one or more source code files, each file including a succession of source code instructions corresponding to a succession of calls issued during execution of the computer program.

3. The method according to claim 1, wherein step (C) comprises recording in a data file data accessed by reference in the selected calls issued during execution of the computer program.

4. The method according to claim 3, wherein step (C) comprises recording, along with the source code instructions, data accessed by value in the selected calls issued during execution of the computer program.

5. The method according to claim 1, further comprising the steps of:
    intercepting a call issued during execution of the computer program with a routine having a name like that to which the intercepted call is directed; and
    generating a call to the routine to which the intercepted call was directed.

6. The method according to claim 1, wherein step (B) is performed prior to step (C).

7. The method of claim 1 wherein the source code instructions corresponding to at least selected calls issued during such execution are compilable.

8. A method for analyzing calls issued by a computer program to a graphics library, the method comprising the steps of:
    (A) executing the computer program; and
    (B) recording, in one or more source code files, source code instructions corresponding to at least selected calls issued during execution of the computer program to the graphics library, each file including a succession of source code instructions corresponding to a succession of calls issued during execution of the computer program; and
    recording in one or more data files that are separate from the source code files, at least selected data that are accessed by reference in the selected calls issued during execution of the computer program.

9. The method according to claim 8, further comprising the step of:
    analyzing execution of the computer program, such analyzing comprising compiling and executing the source code files.

10. The method according to claim 8, further comprising the step of:
    analyzing execution of the computer program, such analyzing comprising the steps of:
        (i) identifying one or more graphics primitives rendered by calls in an instruction sequence;
        (ii) identifying a composite graphical state in which those primitives are rendered; and
        (iii) reporting one or more of the composite graphical states identified in step (ii) and citing, for each of those composite graphical states, one or more of the primitives rendered in that composite graphical state.

11. The method according to claim 9, further comprising the steps of:
    responding to a graphics call that accesses a datum by reference to an address space of the computer program for recording the datum to a storage area in the data file and recording in the source code file a source code instruction that corresponds to the graphics call and that refers to the storage area in the data file; and
    responding to a graphics call that accesses a datum by value for recording in the source code file a source code instruction that corresponds to the graphics call and that access the datum by value in that call.

12. The method according to claim 8, further comprising the steps of:

intercepting a graphics call issued during execution of the computer program with a routine having a name like that to which the intercepted call is directed; and generating a call to the routine to which the intercepted call was directed.

13. The method according to claim 12, wherein step (A) includes the step of responding to a graphics call that affects a graphics display window for recording to the source code file, along with the source code instruction corresponding to the intercepted call, zero, one or more source code instructions for at least one of creating and maintaining that graphics display window.

14. The method of claim 8 wherein the one or more source code files are compilable.

15. A digital data processing system comprising:

a library comprising routines;

an application program, wherein the application program generates calls to the routines in the library;

an interceptor, connected to the library and application program, comprising stub routines corresponding to the routines in the library, wherein the stub routines are executed in response to calls to the routines in the library;

a recorder, connected to the interceptor, wherein the recorder receives routine names and parameter lists for the calls to the routines in the library;

one or more source files, connected to the recorder, in which source code statements corresponding to the calls to the routines in the library are stored; and a data file, connected to the recorder, in which data corresponding to the parameter lists in the calls to the routines in the library are stored, the data file being separate from the one or more source files.

16. The digital data processing system of claim 15 further comprising:

a controller, connected to the interceptor and the recorder, wherein the controller can enable or disable the interceptor and the recorder.

17. The digital data processing system of claim 15 further comprising:

an analyzer, connected to the source files, wherein the analyzer analyzes the compilable source code statements.

18. The digital data processing system of claim 15 further comprising:

a second library, connected to the application program, comprising routines, wherein the application program generates calls to the routines in the second library, and the calls to the routines in the second library bypass the interceptor.

19. The system of claim 15 wherein the one or more source files are compilable.

* * * * *